(12) United States Patent
Malkin et al.

(10) Patent No.: US 7,624,343 B2
(45) Date of Patent: Nov. 24, 2009

(54) PERFORMANCE OPTIMIZATION FOR TEXT LAYOUT PROCESSING

(75) Inventors: Sergey Malkin, Redmond, WA (US); Antonio Vargas Garcia, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 11/228,695

(22) Filed: Sep. 16, 2005

(65) Prior Publication Data

US 2007/0067718 A1 Mar. 22, 2007

(51) Int. Cl.
    *G06F 17/21* (2006.01)

(52) U.S. Cl. .................. 715/256; 715/243; 715/249

(58) Field of Classification Search .............. 715/531, 715/202
See application file for complete search history.

(56) References Cited

U.S. PATENT DOCUMENTS

2004/0160443 A1*  8/2004  Beaman et al. ............. 345/467
2006/0036977 A1*  2/2006  Cohn et al. ..................... 716/4

* cited by examiner

*Primary Examiner*—Doug Hutton
*Assistant Examiner*—Tionna Smith
(74) *Attorney, Agent, or Firm*—West, Champlin & Kelly, P.A.

(57) ABSTRACT

A text formatting system includes a set of rules that are each configured to be applied to perform a text formatting adjustment. An engine is configured to process an input to make a determination as to which rules in the set should be applied so as to carry out a text formatting adjustment on the input. The engine is further configured to process the input without checking every rule in said set for applicability to every component of said input.

8 Claims, 5 Drawing Sheets

PERFORMANCE OPTIMIZATION FOR TEXT LAYOUT PROCESSING

BACKGROUND

In a simplified example of text formatting, input into a computing system is translated into corresponding characters. In some cases, the characters may then be directly translated into corresponding glyphs. A glyph is essentially a shape in a font that is used to represent a character. Glyphs that correspond to the original input are presented on screen, on paper, etc.

The text formatting process is not always so simple. For certain complex fonts (e.g., a cursive handwriting font) or certain languages other than English (e.g., Arabic), a one-to-one translation of character-to-glyph may not lead to satisfactory results. In many cases, an additional layer of processing is required to choose correct character forms.

One way to facilitate selection of an appropriate form for a given character is through application of a set of rules (which also may be referred to as lookups or some other term of art). The nature of the rules may vary. For example, some rules may be defined based on a language rationale. A font designer may craft customized rules to improve upon font characteristics. Regardless of their source, the complexity of rules may vary from simple to complex. It is generally desirable to execute the rules as efficiently as possible in order to enable a quick transition from input to textual output.

The actual application of rules might arise in a variety of contexts. In one example of such a context, a collection of rules is specially formatted for execution by a generic processor or engine that is configured to apply the rules so as to transform characters into proper glyphs. This type of processor or engine may be implemented as part of a computer operating system. In many cases, execution of rules by the engine or processor is on a font-specific basis. Depending on a given input and target font, some rules will apply while others will not. It is generally desirable to identify and execute applicable rules efficiently in order to enable a quick transition from input to textual output.

The material in this section is merely provided for general background information and is not intended for use as an aid in determining the scope of the claimed subject matter. Further, it should also be emphasized that the claimed subject matter is not limited to implementations that solve any or all of the disadvantages of any currently known systems noted in this section.

SUMMARY

This Summary is provided to introduce, in a simplified form, a selection of concepts that are further described below in the Detailed Description. This Summary is not intended to identify key features or essential features of the claimed subject matter, nor is it intended for use as an aid in determining the scope of the claimed subject matter.

A text formatting system includes a set of rules that are each configured to be applied to perform a text formatting adjustment. An engine is configured to process an input to make a determination as to which rules in the set should be applied so as to carry out a text formatting adjustment on the input. The engine is further configured to process the input without checking every rule in said set for applicability to every component of said input.

DETAILED DESCRIPTION

Figure 1:
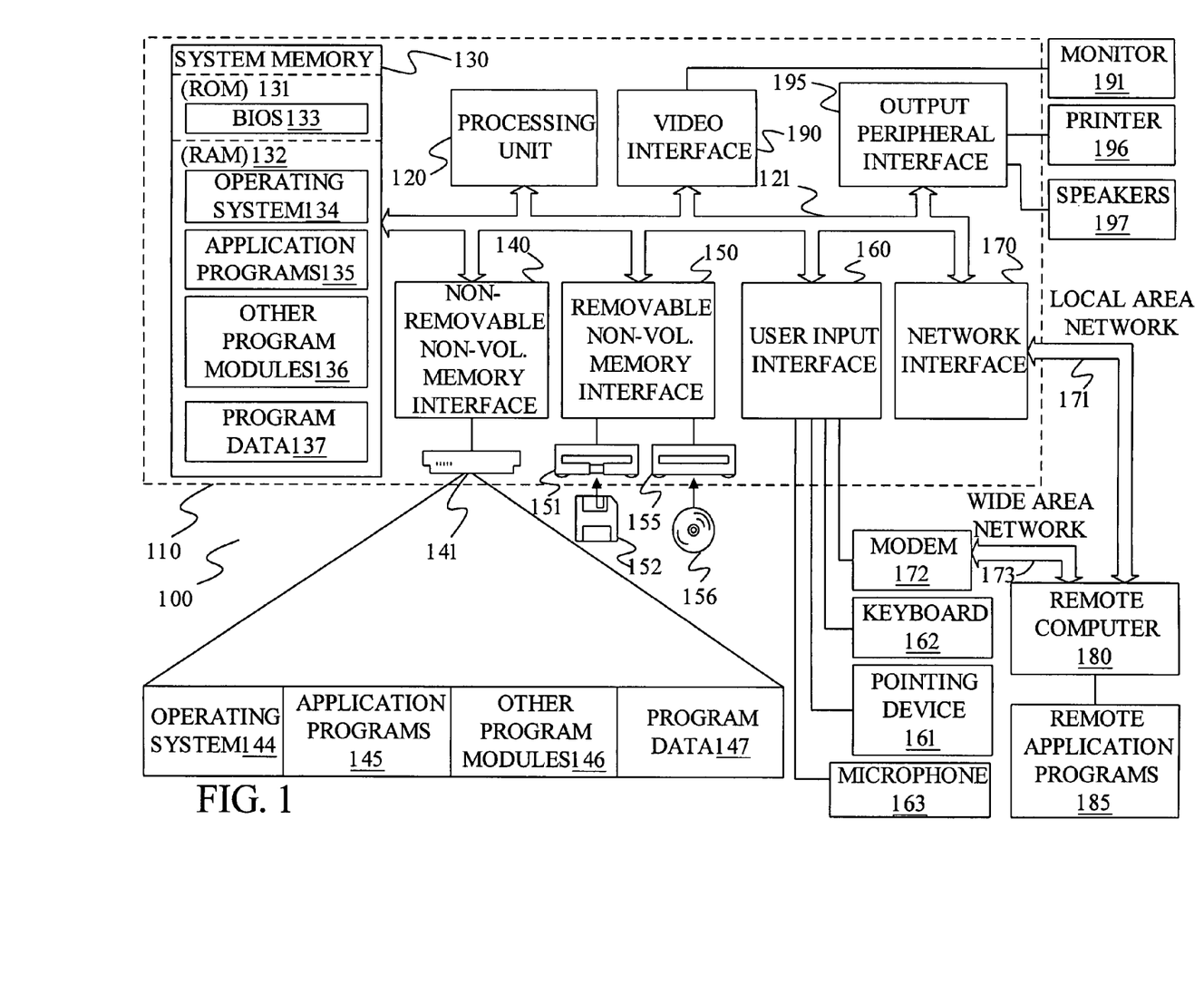
FIG. 1 is a block diagram of one computing environment.

FIG. 1 illustrates an example of one applicable computing environment 100. The computing environment 100 is only one example of an applicable computing environment and is not intended to suggest any limitation as to scope of use or functionality. Neither should computing environment 100 be interpreted as having any dependency or requirement relating to any one or combination of illustrated components.

Other applicable environments include numerous other general purpose or special purpose computing systems or configurations. Examples include, but are not limited to, personal computers, server computers, hand-held or laptop devices, multiprocessor systems, microprocessor-based systems, set top boxes, programmable consumer electronics, network PCs, minicomputers, mainframe computers, telephony systems, and distributed computing environments that include any of the above systems or devices, and the like.

Embodiments of the invention may be described in the general context of computer-executable instructions, such as program modules, to be executed by a computer. Generally, program modules include routines, programs, objects, components, data structures, etc. that perform particular tasks or implement particular abstract data types. Embodiments may also be practiced in distributed computing environments where tasks are performed by remote processing devices that are linked through a communications network. In a distributed computing environment, program modules may be located in both local and remote computer storage media including memory storage devices.

With reference to FIG. 1, the environment 100 includes a general-purpose computing device in the form of a computer 110. Components of computer 110 may include, but are not limited to, a central processing unit 120, a system memory 130, and a system bus 121 that couples various system components including the system memory to the processing unit 120.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

During a process of text formatting, it is typically determined that a set of rules should be applied to input glyphs. For example, the set of rules might be associated with a particular font. In some cases, the rules are organized into "lookups," wherein each lookup consists of a number of sub-tables representing sub-rules. This lookup terminology will be utilized at different points throughout the remainder of the present description.

Regardless of their precise configuration, lookups may be configured to operate on single or multiple glyphs, and may be dependent on surrounding context. Lookups may be configured to substitute glyphs, to position (move) glyphs relative to other glyphs, or to perform any of a variety of other functions. Lookups are typically executed in a predetermined order, such as a particular order defined in a font table. In many cases, each lookup finishes its function on input before the next lookup starts. It is common that every applicable lookup will try all of its sub-tables at every glyph. The following algorithm demonstrates an algorithm consistent with what has been described:

```
for each lookup (1)
  for each range where lookup applies (2)
    for each glyph in applied range (3)
      for each lookup sub-table
        if (sub-table matches input) then
          Execute the rule; or
          Go to next glyph
```

Full implementation of this algorithm in most cases will lead to performance of a substantial number of unnecessary iterations and becomes relatively slow. Further, problems and inefficiencies arise at least for any of the following list of reasons:
(1) Only a few lookups turn out to actually be applicable to a glyph included in input;
(2) Lookups operate on different glyphs and only one of them can appear in actual input;
(3) Frequently, glyphs substituted by one lookup are not subject to any of the following lookups;
(4) Some lookups operate on very rare conditions that are almost never satisfied in real input; and
(5) The process of identifying ranges where a particular lookup should apply can be expensive.

A simple example emphasizes some of the noted issues. Consider a scenario wherein a particular font includes a first lookup in the following form:

1. A---->C|D

This notation illustratively indicates that glyph 'A' should replaced with glyph 'C' if glyph 'A' is followed by glyph 'D'. For purposes of the example, it will be assumed that the font includes additional lookups in the following form:

2. A---->B|B
3. B---->D|C

The noted lookups are simplified for the purpose of providing a clear illustration. Actual lookups may include more complex context qualifications (e.g., A---->D|DCBA). Also, actual lookups may include context qualifications focused on glyphs that precede rather than follow a particular glyph. Also, as has been described, actual lookups may be organized into rules and sub-rules. Further, it should be noted that an actual font typically includes hundreds of lookups instead of a few.

Continuing with the example, each glyph in the input ABCD is checked against each lookup 1, 2 and 3. The lookups are commonly applied in order (from 1 to 3). In some cases, lookups can be switched off for external reasons such as, but not limited to, user preferences and format settings.

Figure 2:
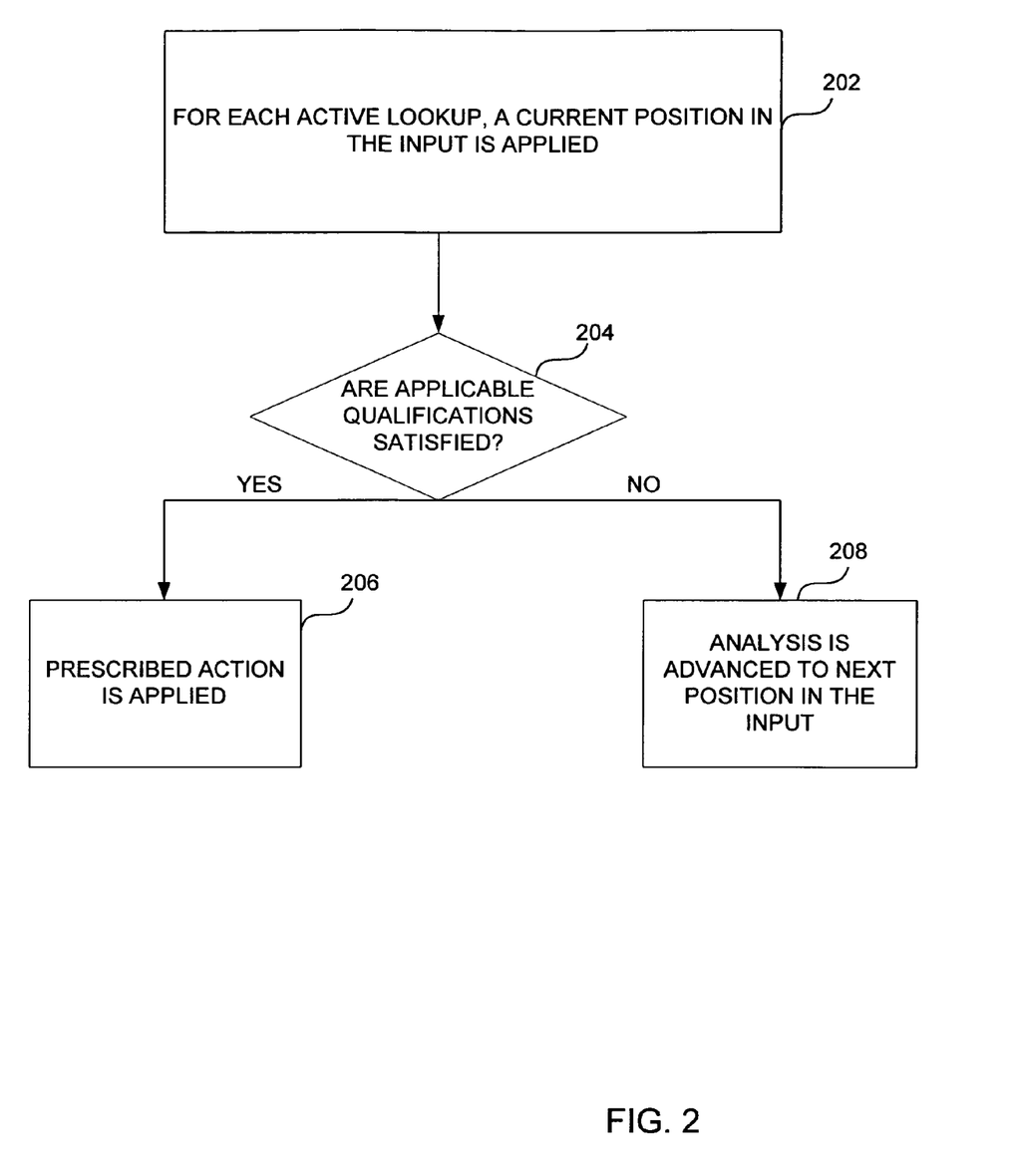
FIG. 2 is a block flow chart illustrating steps associated with a systematic application of lookups.

FIG. 2 is a block flow chart illustrating steps associated with a systematic application of lookups. In accordance with block 202, for each active lookup, a current glyph in the input is applied. Block 204 represents a determination as to whether applicable rule qualifications (e.g., context qualifications) are satisfied. In accordance with block 206, if qualifications are satisfied, then the action prescribed in the lookup is applied. In accordance with block 208, if qualifications are not satisfied, then analysis is advanced to the next position (i.e., glyph) in the input. Lookup by lookup, and glyph by glyph, the analysis proceeds until the list of lookups is exhausted.

To continue the example, assuming an input of a series of glyphs in the form of "ABCD", the first lookup will be tried on each of the four glyphs but there will be no action executed (input does not include the qualifying context). The second lookup will be tried on each glyph with action executed on the first glyph so as to adjust the input string to the form of "BBCD". The third lookup will be tried on each glyph with action executed on the second glyph so as to adjust the input string to the form of "BDCD".

Thus, as the example illustrates, significant amounts of time and processing resources are devoted to matching input glyphs to applicable glyphs noted in the lookups. Many checks are performed but only few lookups actually qualify for action to be taken upon the input. It is advantageous to eliminate any unnecessary processing and enable a more efficient transition from input to textual output.

One way to eliminate unnecessary processing is to implement a list of applicable rules for each glyph in a font under analysis. Then, for a given input glyph, reference can be made to the list in order to limit processing only to applicable lookups. For example, if a font includes 100 lookups but only one can change the input glyph, it is advantageous to skip directly to an examination of the one potentially applicable lookup without checking any of the other irrelevant 99 lookups.

Thus, for a given font, a reference cache is supplied with a list of glyphs that are identified as being inherently connected to one or more lookups. In one embodiment, each glyph in the list includes an indication of its corresponding lookups (e.g., the list indicates that glyph 'A' is associated with lookups #55, #33 and #14). In one embodiment, each glyph in the list is the first glyph in a lookup or rule associated with the font.

Figure 3:
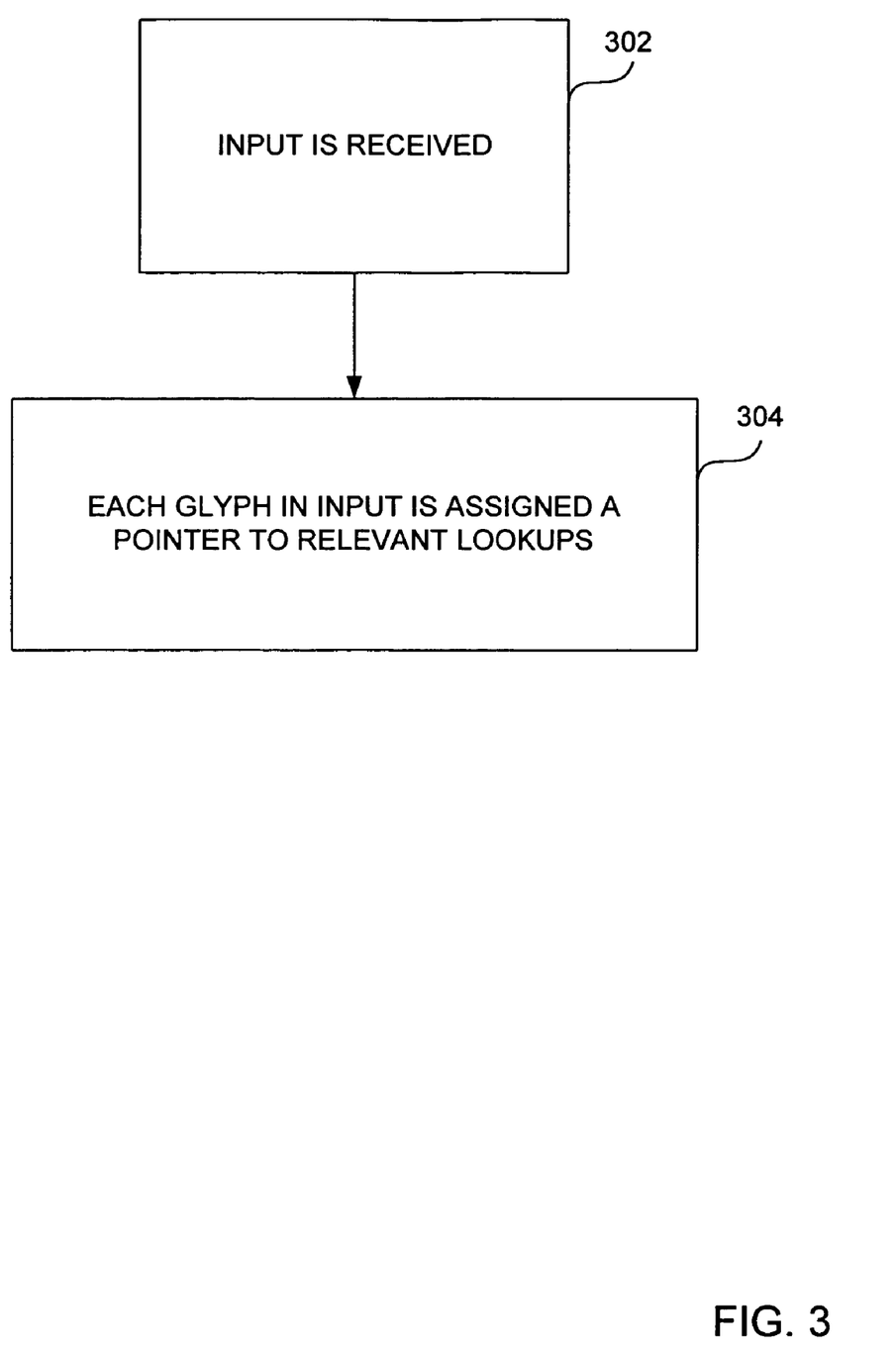
FIG. 3 is a flow chart demonstrating steps associated with establishing a connection between a reference cache and a collection of input.

FIG. 3 is a flow chart demonstrating steps associated with establishing a connection between a reference cache and a collection of input. In accordance with block 302, input is received. In accordance with block 304, each glyph in the input is assigned a pointer to corresponding information in the cache. In one embodiment, for a given input glyph, the pointer serves as a cross-reference to lookups indicated in the cache as being pertinent to that glyph. An array of pointers may be constructed for the input as a whole.

Lookups are illustratively checked and, assuming qualifications are satisfied, applied to glyphs in the input based on the order lookups as organized in the font. The reference cache enables this process to be carried out in a relatively efficient manner.

Figure 4:
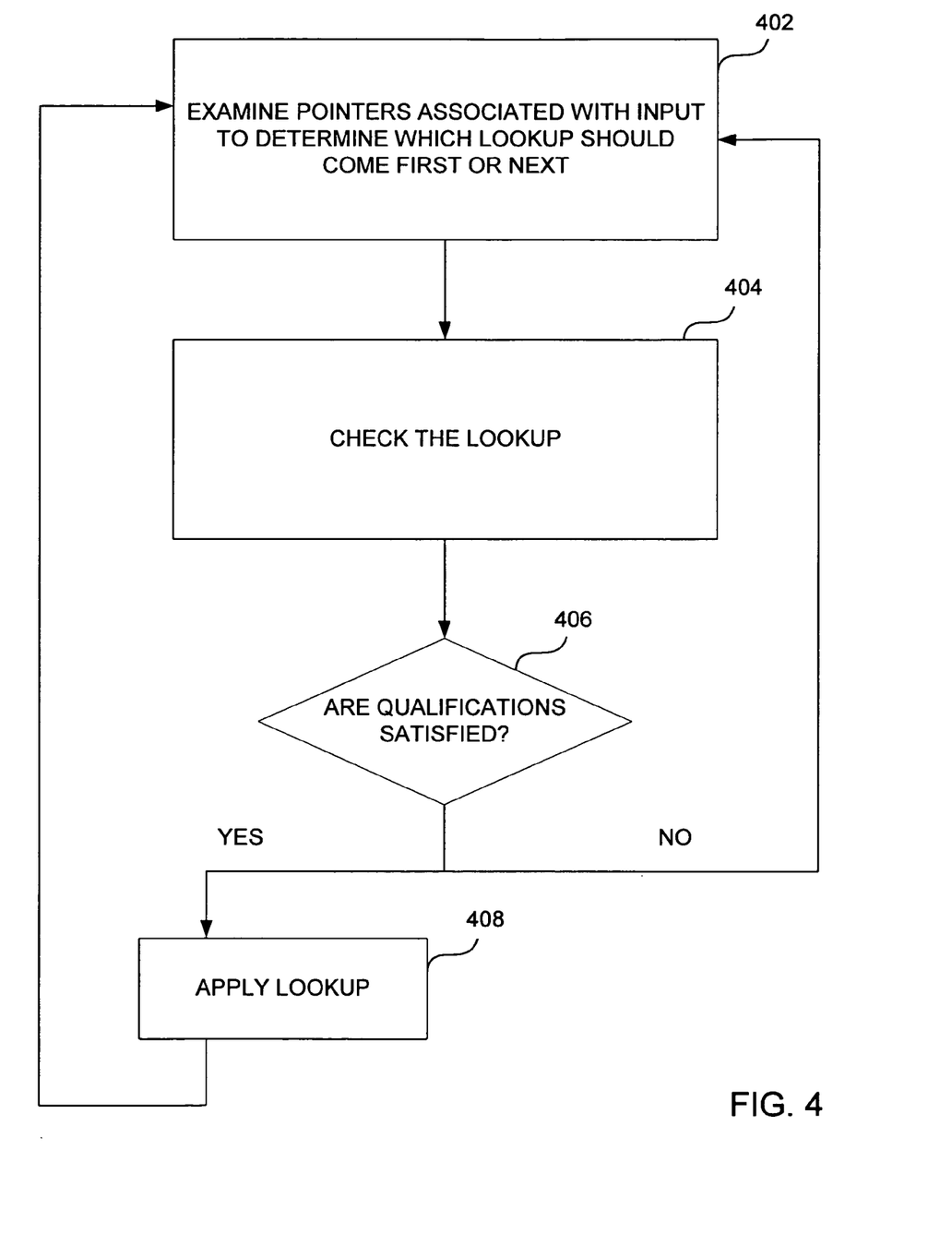
FIG. 4 is a flow chart illustrating steps associated with applying lookups to a collection of input.

FIG. 4 is a flow chart illustrating steps associated with applying lookups to a collection of input. In accordance with step 402, pointers from input glyphs to associated lookups are examined to determine which lookup should be applied first. In one embodiment, it is the lookup that appears first in the font table that should be applied first. In accordance with block 404, the lookup is checked for applicability to the input string. In accordance with block 406, a determination is made as to whether the input string satisfies qualifications associated with the lookup. If qualifications are satisfied, then, in accordance with block 408, action associated with the lookup is carried out. Whether or not the lookup is applied, the process in FIG. 4 is illustratively repeated until all lookups associated with the glyphs in the input have been applied.

In one embodiment, as the lookups are being systematically checked, the pointers (e.g., the array of pointers) are dynamically updated to accommodate any transformations or changes. For example, some executions of lookups could lead to a substitution of glyphs in the input. Such a substitution could eliminate or create a necessity to apply a particular lookup. The array of pointers is illustratively adjusted or modified accordingly.

An example will now be provided to demonstrate application of the described concepts. Consider an example font that includes the following lookups:

1. AK---->C|D
58. A---->B|B
88. B---->D|C
    C---->K|C

For the purpose of emphasizing the vast potential size of the collection of lookups, lookups 2-57 and 59-87 have been left out of the illustration. As lookup #88 demonstrates, one lookup can encompass multiple glyphs. A cache that corresponds to the example font lookups is illustratively filled with information that includes:

A----->1, 58
B----->88
C----->88

The illustrated cache notation demonstrates the fact that, within the example font, glyph 'A' can be impacted by lookups 1 and 58, glyph 'B' can be impacted by lookup 88, and glyph 'C' can be impacted by lookup 88. If a particular glyph does not appear in the cache list then, presumptively, it is not potentially impacted in the example font.

The next step in the process is receipt of input, for example, in the form of "ABCD". For each glyph in the input, corresponding lookups are referenced in the cache. Checks and application of lookups should be conducted in order of lookup rank (e.g., rank reflected in the font table). For example, for each glyph in the input, the lookups in the cache are examined to determine which glyph has the lowest rank. In one embodiment, an array of pointers (pointers to lookups in the cache) is maintained to keep track of which lookups are potentially applicable to the input in its current state.

The lowest ranking lookup associated with the example input "ABCD" is #1. Thus, #1 is the first lookup checked and potentially applied. If the lowest ranking lookup would have been #100, then #100 would have been the first lookup applied (no need to apply the first 99 because they will not apply to the input).

Thus, in the example, it is known that lookup #1 is applicable to input glyph 'A'. Lookup #1 is then checked against input 'A' but not 'BCD'. This eliminates some unnecessary checking of the lookup against irrelevant input. Lookup #1 does not apply, so no changes are made against the input. It is then determined that lookup 58 is the next potentially applicable input (e.g., among lookups referenced by pointers in array, the one with minimal index becomes the next lookup to be processed). Lookup 58 is then checked (only against relevant glyph) and applied so as to change the input to "BBCD". Now that the input string has changed, pointers in the array are updated as necessary to reflect any changes. Thus, when the determination is made as to what lookup will be applied next, the lookups for glyph 'A' will no longer be considered. The newly inserted glyph "B" will have new pointers that are considered. The process of checking and applying lookups based on the dynamically updated array of pointers is continued until all necessary checks and updates have been executed. In the example, the final outcome, following application of lookup #88 is "BDCD".

Processing and time resources are saved through implementation of glyph-to-lookup mapping. Most time during traditional processing is spent in checking context conditions for each lookup. To avoid this loss of time, a mapping from glyph index to the next lookup that can potentially process it is proposed. Each glyph in the font can have an associated cache entry containing a list of such lookups. Not all of the lookups in the list will actually match with given input, because surrounding context can not be matched during the following check. The proposed mapping provides partial filtering by a first glyph being matched by lookup.

Using this mapping, an engine can identify the next lookup that can potentially match its context, and find potential matching positions in the input. An appropriate processing algorithm illustratively looks like:

for each potentially matching lookup
   for each potentially matching position within range where lookup enabled
      for each lookup sub-table
         if (sub-table matches input) then
            Execute the rule
            Go to next position (skip rest of sub-tables)

It is notable that this algorithm refers a range within which a lookup is "enabled." In one embodiment a given lookup might be enabled or disengaged for a particular part of an input depending, for example, on system settings and/or user preferences. Also, it is worth mentioning that implementation could just as easily be modified such that for every matching glyph, a check is performed as to whether there is enablement within the applicable range.

In one embodiment, the cache may be extended to store mapping from glyph directly to a particular sub-table instead of a whole lookup. In this case, the main algorithm will be very similar but "for each lookup sub-table" is substituted with "for each sub-table applicable to this glyph." Both glyph-lookup mapping and sub-table-lookup mapping are within the scope of the present invention.

In one embodiment, the cache is static in that it is simply structured to contain a list of glyphs that each point to a list of lookup indices. The cache is, however, dynamic (per call) in that is structured such that every glyph in the input has an associated pointer to the list of lookups that can potentially match it. This pointer is initially assigned to the first element of this list. When iterating through the lookups, a pointer is being moved forward to point to the first lookup index that is equal or greater than current lookup in process. This allows code to avoid complex check operations during a check whether glyph can be matched by lookup.

The remainder of the present description will be devoted to issues surrounding the building, structure, and size management of the reference cache (i.e., the glyph map cache). To support the described glyph-to-lookup mapping optimization, a specialized data set is compiled and used. As will be described below, data structure techniques can be implemented to provide speed without significant increases to an application's working set. In addition, as will also be described below, specialized code can be implemented to avoid denial-of-service attacks with corrupted fonts. Further, the data structures are preferably flexible to be persistently stored or shared between processes on a machine where the system is running.

In one embodiment, the main cache structure contains a list of glyphs, each having a link to a list of corresponding lookups. Lookup lists may be shared between glyphs to save cache space. In one embodiment, cache structure illustratively utilizes internal offsets instead of pointers, allowing the cache to be persisted on disk or shared between processes.

Figure 5:
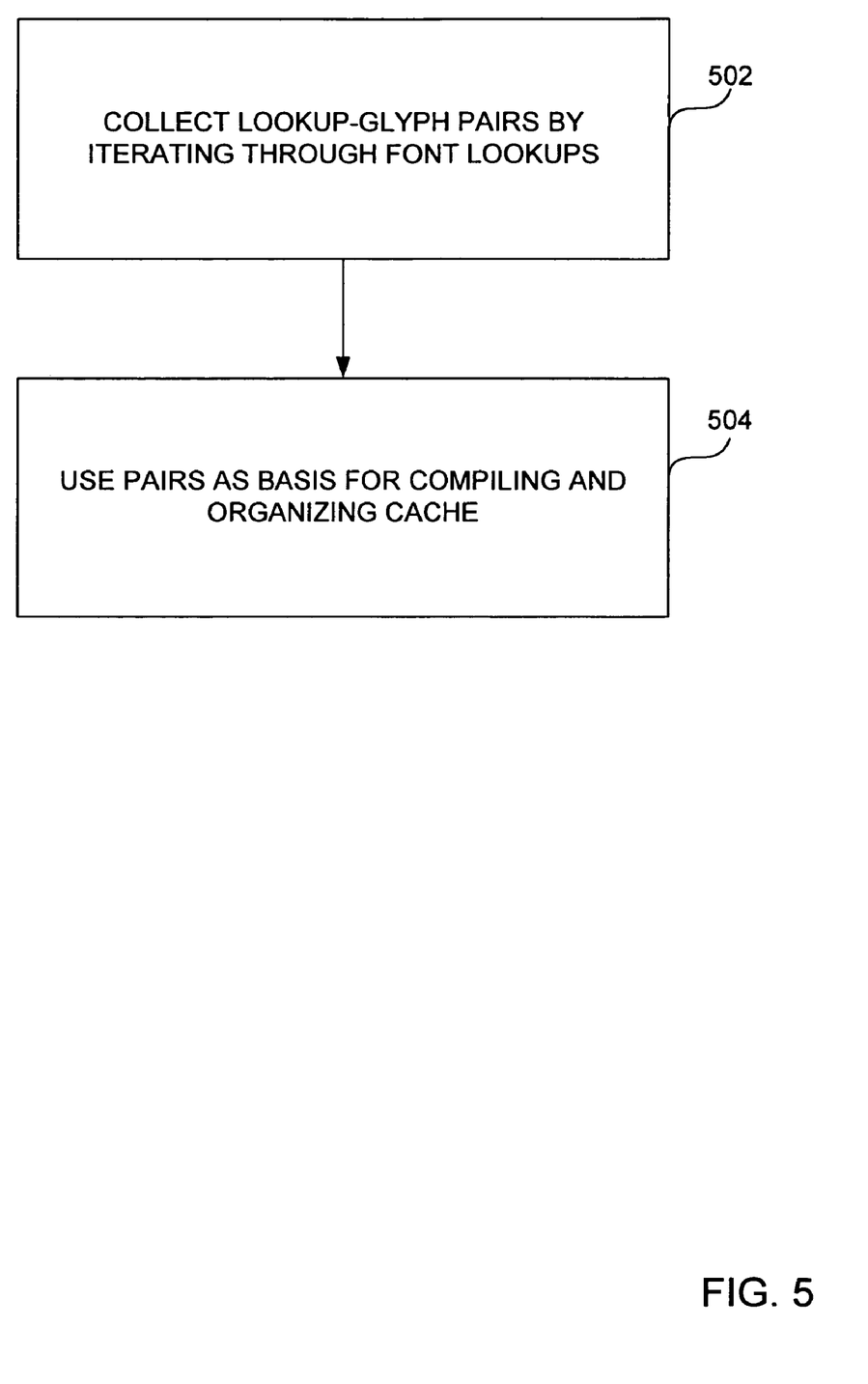
FIG. 5 is a flow chart illustrating steps associated with construction of a reference cache.

FIG. 5 is a flow chart diagram illustrating steps associated with construction of a reference cache. In accordance with block 502, lookup-glyph pairs are collection based on iterations through lookups associated with a font (i.e., restricted to lookups referenced in features). Because several lookup sub-tables can work on the same glyph, duplicate pairs can appear in the cache. In one embodiment, dedicated code can be implemented to detect and remove duplicates at the time they are being added, thus saving processing time during subsequent steps.

In accordance with block 504, the pair data is utilized to compile and organize the reference cache. The pair data is illustratively reordered by glyph identifier and then by lookup index. At that point, the actual number of distinct glyph identifiers and lookup list entries is calculated and the cache is compiled.

In one embodiment, the compilation algorithm allows the maximum cache size to be controlled. In one embodiment, the cache building algorithm enables restriction of cache size to a predefined amount of memory. It is possible that only a part of all lookups may make it into the reference cache. Several iterations may be made to fit into a requested maximum size. In one embodiment, only whole lookups are allowed to be placed into the reference cache to support correct processing (i.e., if not all pairs for a lookup fit into the allowed amount of memory, whole lookup is not processed.)

In one embodiment, only lookups that are associated with some feature are cached for the purpose of saving space and cache building time.

Generally speaking, cache size can not be calculated in advance based on the number of entries in the lookup-glyph pair list. That being said, heuristics may be utilized to define an allowed number of pairs based on an allowed cache size. No more than a defined number of pairs will be recorded. Thus, in one embodiment, the cache building algorithm calculates cache size based on the set of lookup-glyph pairs. In most cases, heuristics work well and the cache will fit into the predefined maximum memory size. If necessary, lookups are removed from the list until the cache fits within the maximum allowed size. In one embodiment, space compression is conducted at compile time, for example, by identifying and remedying duplicate lists.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of selectively checking a set of text formatting rules for applicability to an input, the method comprising:
   receiving an input;
   utilizing a computer processor that is a functional component of the computer to reference a cache to identify a sub-set of the set of text formatting rules, the sub-set containing rules that are specifically applicable to the input, wherein the sub-set is a limited number of rules selected from the set of text formatting rules, the limited number being less than all of the rules in the set of text formatting rules;
   wherein referencing a cache comprises maintaining an array of pointers to rules indicated in the cache as being associated with at least one glyph contained in the input;
   applying, to the input, rules indicated by the array of pointers, wherein the rules are applied in the order that they are listed in the set of rules; and
   dynamically updating the array of pointers to reflect changes made to the input.

2. The method of claim 1, wherein:
   receiving an input comprises receiving an input that contains a plurality of glyphs;
   referencing a cache comprises referencing a cache to identify a particular sub-set of rules that are specifically associated with a particular glyph in the input; and
   applying to the input t further comprises applying the particular sub-set of rules only to the particular glyph and not the other glyphs in the input.

3. The method of claim 1, wherein dynamically updating further comprises dynamically updating the array of pointers to reflect at least one change made to the input as a result of application of a rule from the sub-set.

4. A computer-implemented text formatting system comprising:
   a set of rules that are each configured to be applied to perform a text formatting adjustment;
   an engine that utilizes a computer processor that is a functional component of the computer to process an input and make a determination as to which rules in the set should be applied so as to carry out a text formatting adjustment on the input, wherein the engine also processes the input without checking every rule in said set for applicability to every component of said input, and wherein the engine checks a sub-set of rules for applicability to the input, the sub-set being a limited number of rules selected from said set, the limited number being less than all of the rules;
   wherein the engine checks a single rule, selected from said set, for applicability to less than all the components of the input;
   a cache stored on a computer-readable storage medium;
   an array of pointers to rules from the set indicated in the cache as being associated with at least one glyph contained in the input; and
   wherein the engine references the array of pointers when making the determination as to which rules in the set should be applied.

5. The system of claim 4, wherein the engine checks a single rule, selected from said set, for applicability to a limited number of glyphs contained in the input, the limited number being less than all glyphs contained in the input.

6. The system of claim 4, further comprising:
   a cache containing at least one indication of a glyph with one or more associated rules from the set of rules; and
   wherein the engine references the cache to support the determination as to which rules in the set should be applied.

7. The system of claim 4, wherein the array of pointers is dynamically updated as changes are made to the input.

8. The system of claim 4, wherein the engine applies rules indicated by the array of pointers, wherein the rules are applied in the order they are listed in the set of rules.

* * * * *

UNITED STATES PATENT AND TRADEMARK OFFICE
CERTIFICATE OF CORRECTION

Page 1 of 1

PATENT NO. : 7,624,343 B2
APPLICATION NO. : 11/228695
DATED : November 24, 2009
INVENTOR(S) : Sergey Malkin et al.

It is certified that error appears in the above-identified patent and that said Letters Patent is hereby corrected as shown below:

In the Claims:

In column 10, line 1, in Claim 2, after "input" delete "t".

In column 10, line 24, in Claim 4, after "all" insert -- of --.

Signed and Sealed this
First Day of February, 2011

David J. Kappos
*Director of the United States Patent and Trademark Office*